(12) United States Patent
Shimoda et al.

(10) Patent No.: US 6,777,895 B2
(45) Date of Patent: Aug. 17, 2004

(54) VIBRATING LINEAR ACTUATOR (75) Inventors: Kazuhiro Shimoda, Osaka (JP); Shinichiro Kawano, Osaka (JP); Noriyoshi Nishiyama, Osaka (JP); Toshiyuki Iwahori, Tottori (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/300,411

(22) Filed: Nov. 20, 2002

(65) Prior Publication Data

US 2003/0114999 A1 Jun. 19, 2003

(30) Foreign Application Priority Data

Nov. 22, 2001 (JP) ........................................ 2001-358109

(51) Int. Cl.⁷ ............................................... H02F 33/00
(52) U.S. Cl. ..................... 318/114; 340/7.6; 340/388.1; 340/407.1
(58) Field of Search ................................. 340/7.58, 7.6, 340/388.1, 391.1, 396.1, 407.1, FOR 246; 318/114

(56) References Cited

U.S. PATENT DOCUMENTS

| | | | | |
|---|---|---|---|---|
| 5,107,540 A | * | 4/1992 | Mooney et al. | 381/431 |
| 5,252,873 A | * | 10/1993 | Hamamoto et al. | 310/90 |
| 5,327,120 A | | 7/1994 | McKee et al. | 340/7.6 |
| 5,682,132 A | | 10/1997 | Hiroyoshi et al. | 340/407.1 |
| 5,894,263 A | | 4/1999 | Shimakawa et al. | 340/388.1 |
| 6,323,758 B1 | * | 11/2001 | Morita | 340/407.1 |
| 6,365,995 B1 | * | 4/2002 | Fukuda et al. | 310/81 |
| 6,492,899 B1 | * | 12/2002 | Yamaguchi | 340/407.1 |

FOREIGN PATENT DOCUMENTS

WO   WO 95/01622   1/1995

* cited by examiner

*Primary Examiner*—Thanh Lam
*Assistant Examiner*—Judson H. Jones
(74) *Attorney, Agent, or Firm*—RatnerPrestia

(57) ABSTRACT

A vibrating linear actuator includes a mover having a permanent magnet, a stator having coils, a base on which the stator is mounted, a cover, and lands electrically coupled to the coils. The lands are provided on the surface of one of the base or the cover.

7 Claims, 11 Drawing Sheets

FIG. 1

Vibrating direction

VIBRATING LINEAR ACTUATOR

TECHNICAL FIELD

The present invention relates to vibrating linear actuators used in portable information terminals.

BACKGROUND ART

A vibrating paging-function is now essential to portable information terminals such as cellular phones. The market requires vibration generators to be thinner because the portable information terminals have become slimmer and slimmer. At the same time, the vibration generators are demanded to be surface-mounted on a circuit board like other electronic components because the portable information terminals need a higher packing density.

Figure 14:
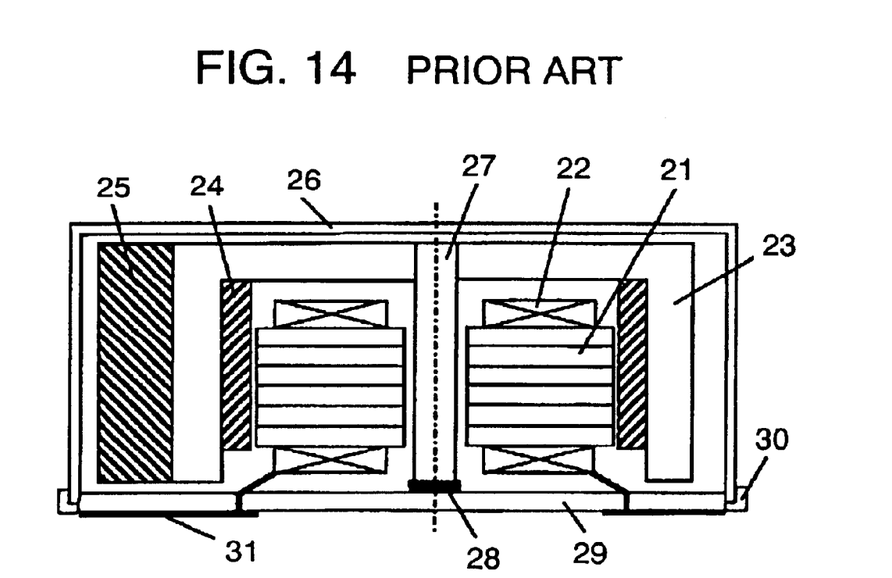
FIG. 14 shows a conventional rotating vibration motor.

FIG. 14 shows a conventional vibration generator which uses a rotating motor including unbalancing weight 25. This vibration generator generates vibrations in parallel with the circuit board; however, a user feels vibrations vertical to the circuit board more sensitively. Thus the market prefers vibrations vertical to the circuit board.

Figure 15:
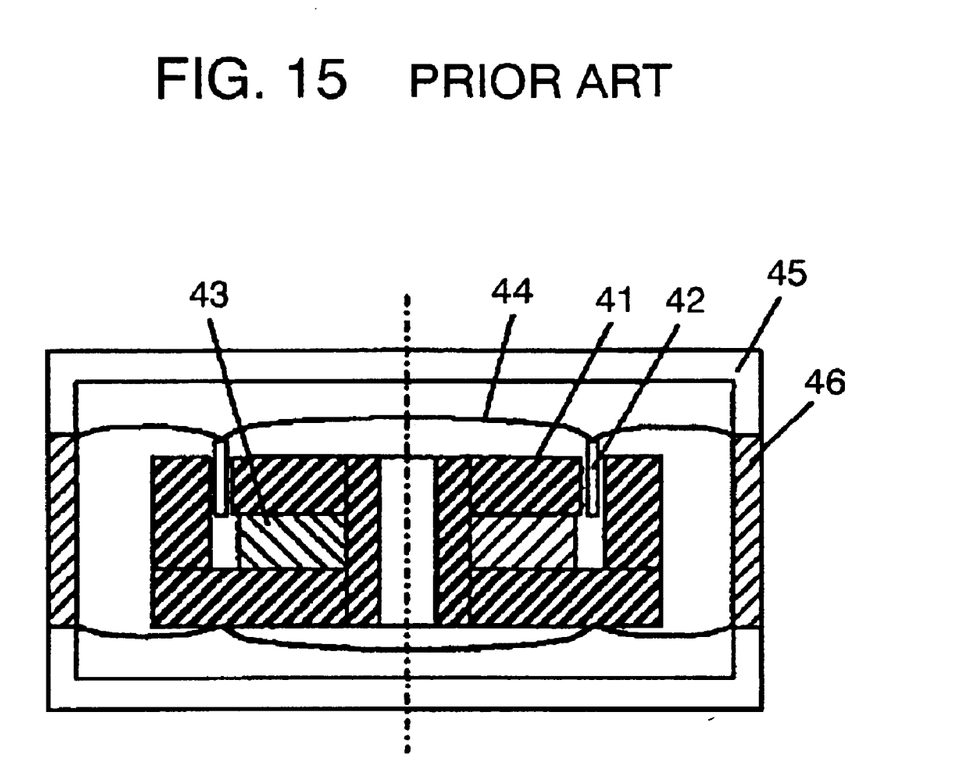
FIG. 15 shows a conventional vibrating actuator.

FIG. 15 shows another conventional vibration generator that uses voice coil 42 and is to be surface-mounted on a circuit board. This vibration generator is a multifunctional vibrating actuator that generates vibrations vertical to the circuit board, and works as a speaker and a buzzer. However, since it is used as a sound source, it should not be closed with a cover, and diaphragm 44 that produces sound is not resistant enough to heat. This vibration generator thus does not fit to reflow soldering.

DISCLOSURE OF INVENTION

The present invention addresses the problems discussed above, and aims to provide a vibrating linear actuator that vibrates vertically to the circuit board and is resistant enough to heat.

The vibrating linear actuator of the present invention comprises the following elements:
 a mover including a permanent magnet;
 a stator including coils that generate vibrating magnetic field which vibrates the mover;
 a base on which the stator is mounted;
 a cover that is provided on the base and covers the mover and the stator; and
 an electrode prepared on the surface of one of the base and the cover and electrically coupled to the coils.

DESCRIPTION OF THE PREFERRED EMBODIMENT

An exemplary embodiment of the present invention is demonstrated hereinafter with reference to the accompanying drawings. FIGS. 1, 2, 3A and 3B illustrate a structure of a vibrating linear actuator (hereinafter simply referred to as an actuator) of the present invention. Actuator 1 comprises the following elements:
 polygonal outer yoke 4;
 cylindrical inner yoke 3 disposed inside outer yoke 4;
 coil 2 wound on inner yoke 3; and
 magnet 5 provided to outer yoke 4 such that magnet 5 faces to inner yoke 3.

Figure 1:
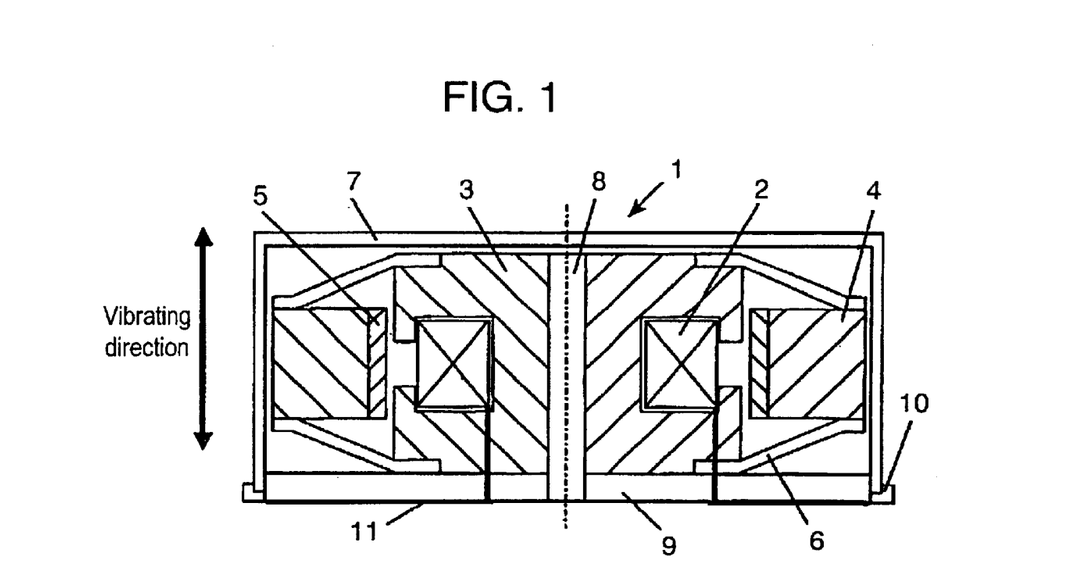
FIG. 1 shows a sectional view of a vibrating linear actuator in accordance with an exemplary embodiment of the present invention.

Inner yoke 3 and outer yoke 4 are made from metallic substance formed of green compact of magnetic powder. Those yokes can be formed by laminating steal sheets radially on shaft 8. Inner yoke 3 and coil 2 form a stator, and outer yoke 4 and magnet 5 form a mover.

Inner yoke 3 holds shaft 8 at the center of yoke 3, and a first end of shaft 8 extends through a bottom face of inner yoke 3. Inner yoke 3 is positioned by the extruding portion of shaft 8 and a recess of base 9, and rigidly mounted on base 9. A lower supporter 6 made of elastic body is inserted between base 9 and inner yoke 3. Base 9 is made from heat-resistant resin of which glass transition temperature is not less than 90° C.

Figure 2:
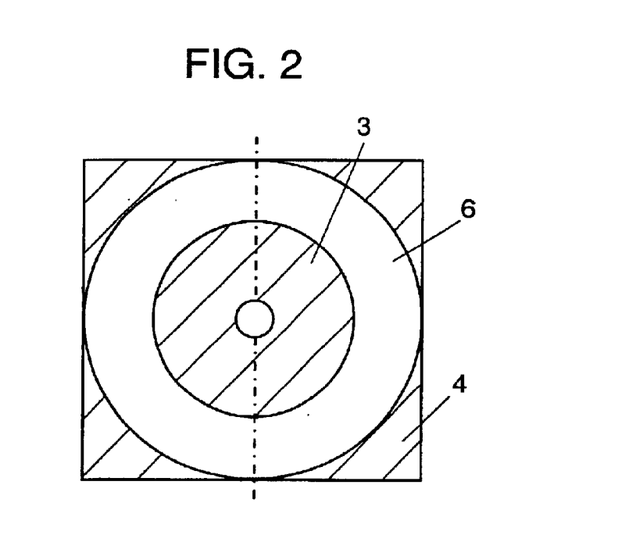
FIG. 2 shows a bottom view of the actuator.

FIG. 2 shows a bottom view of actuator 1. Supporter 6 is formed of a ring-shaped leaf spring, and when outer yoke 4 moves downward from a balanced point, supporter 6 moves outer yoke 4 upward. When outer yoke 4 moves upward from the balanced position, supporter 6 moves outer yoke 4 downward.

Coil 2 is electrically coupled to metallic land 11 extending from the bottom of base 9, and powered from land 11, which works as an electrode of coil 2. Land 11 can be prepared on a top face of cover 7 instead of the bottom of base 9.

Cover 7 covers inner yoke 3 and outer yoke 4, and is caulked to base 9 with cover-caulking section 10 provided to base 9. Cover 7 protects the inside of the actuator from outside air or damages when the actuator undergoes reflow soldering. Cover 7 also helps handling of the actuator. Cover 7 is made from metal; however, it can be made from heat-resistant resin.

Actuator 1 flows the current supplied from land 11 to coil 2, thereby generating vibrating magnetic flux. This vibrating magnetic flux drives outer yoke 4 to vibrate up and down as indicated with an arrow mark in FIG. 1.

Figure 3A:
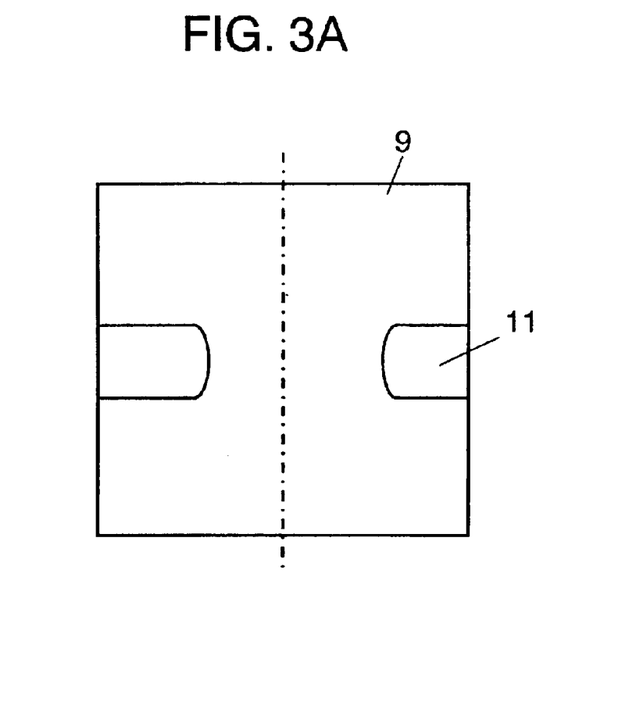
FIG. 3A shows a bottom view of a base of the vibrating linear actuator.
Figure 3B:
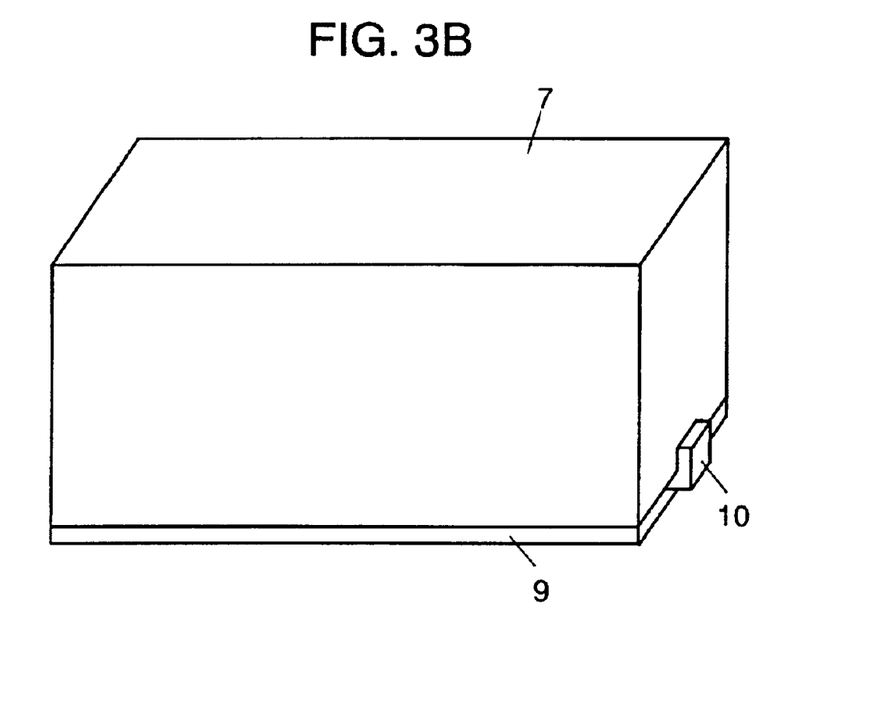
FIG. 3B shows a perspective view of the vibrating linear actuator.

FIG. 3A shows the bottom of base 9, and land 11 is exposed from the bottom. FIG. 3B shows a perspective view of the actuator covered with cover 7.

The actuator of the present invention have the following advantages:
(1) mountable directly to a circuit board of portable terminals;
(2) vibrating vertically to the circuit board of portable terminals; and
(3) mountable to the circuit board of portable terminals by reflow soldering.

Figure 4A:
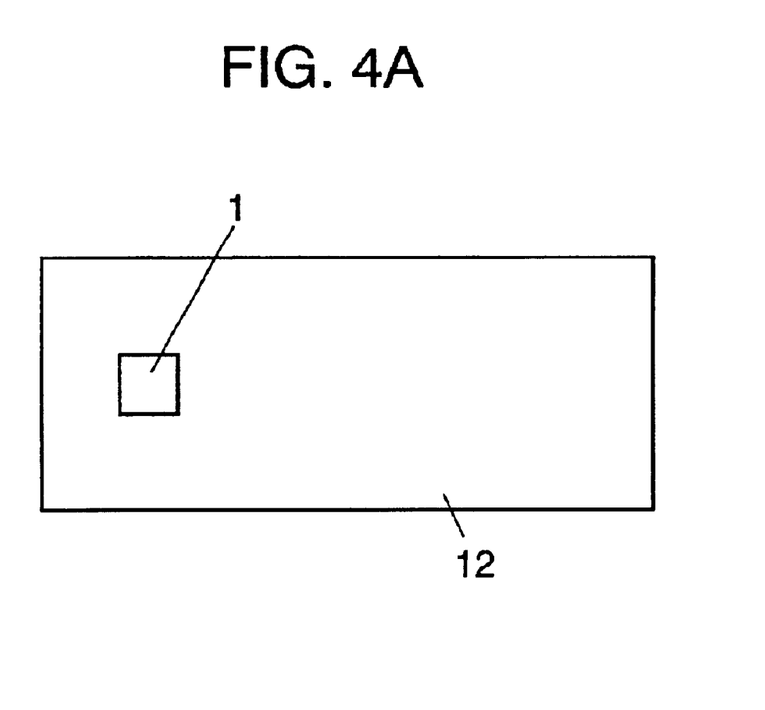
FIG. 4A shows a top view of a circuit board on which a vibrating linear actuator is mounted.
Figure 4B:
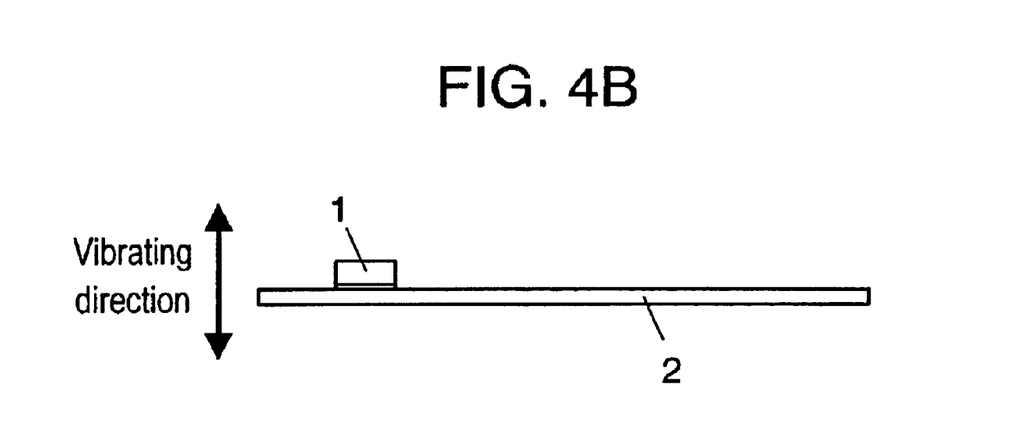
FIG. 4B shows a lateral view of the circuit board shown in FIG. 4A.
Figure 5:
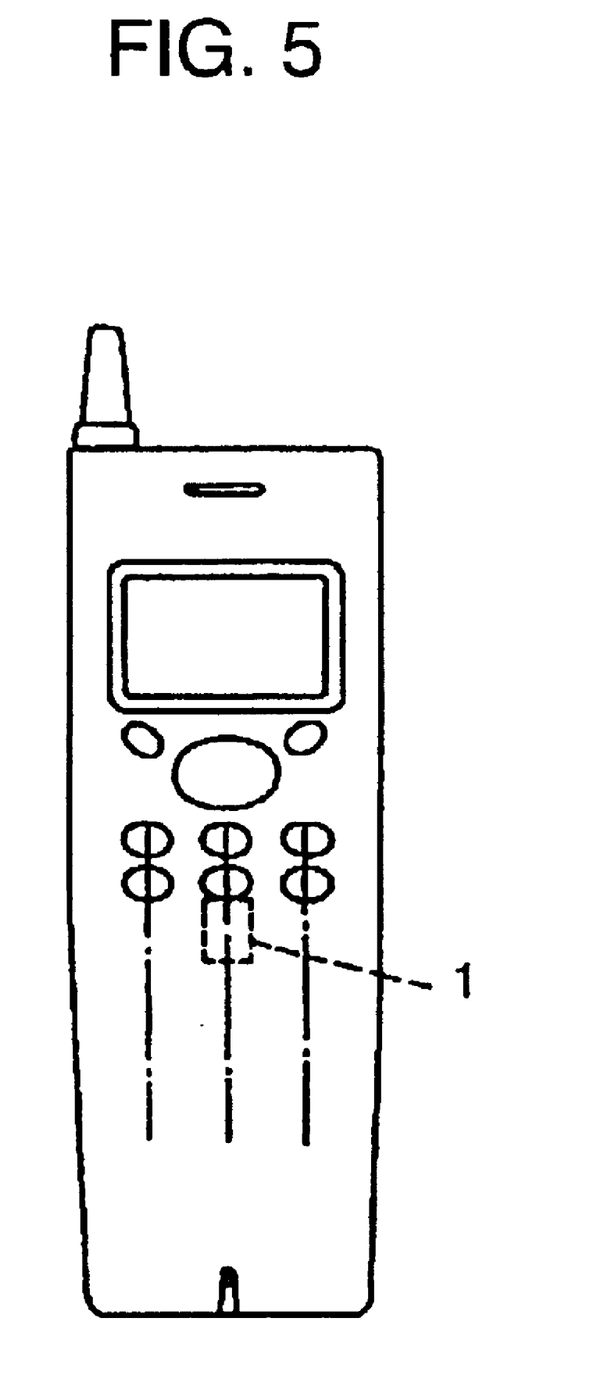
FIG. 5 shows a cellular phone employing the vibrating linear actuator of the present invention.
Figure 6A:
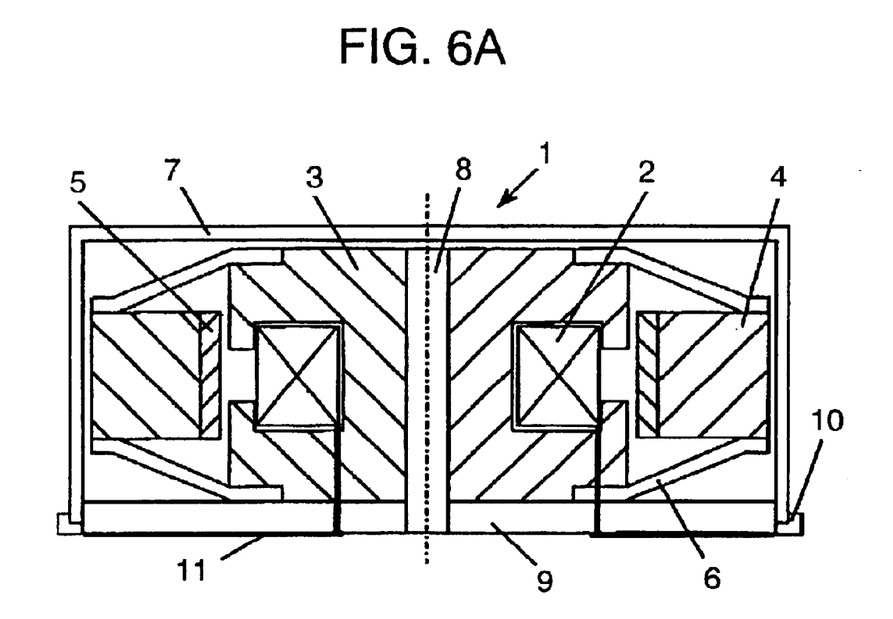
FIG. 6A shows a sectional view of a vibrating linear actuator including a cylindrical outer yoke.
Figure 6B:
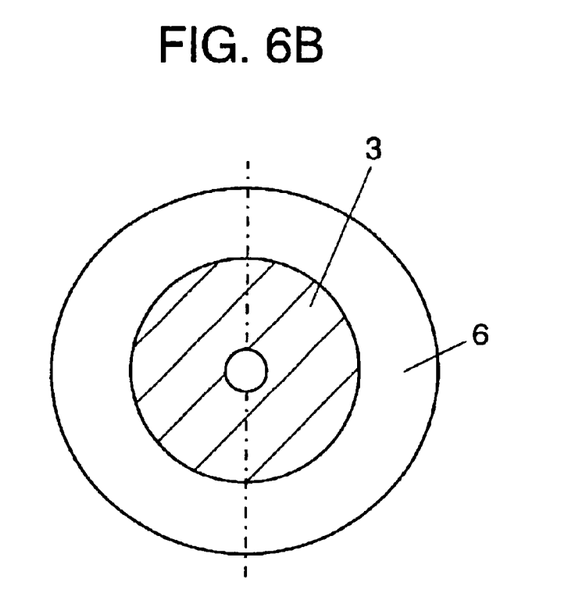
FIG. 6B shows a bottom view of the cylindrical outer yoke shown in FIG. 6A.
Figure 7A:
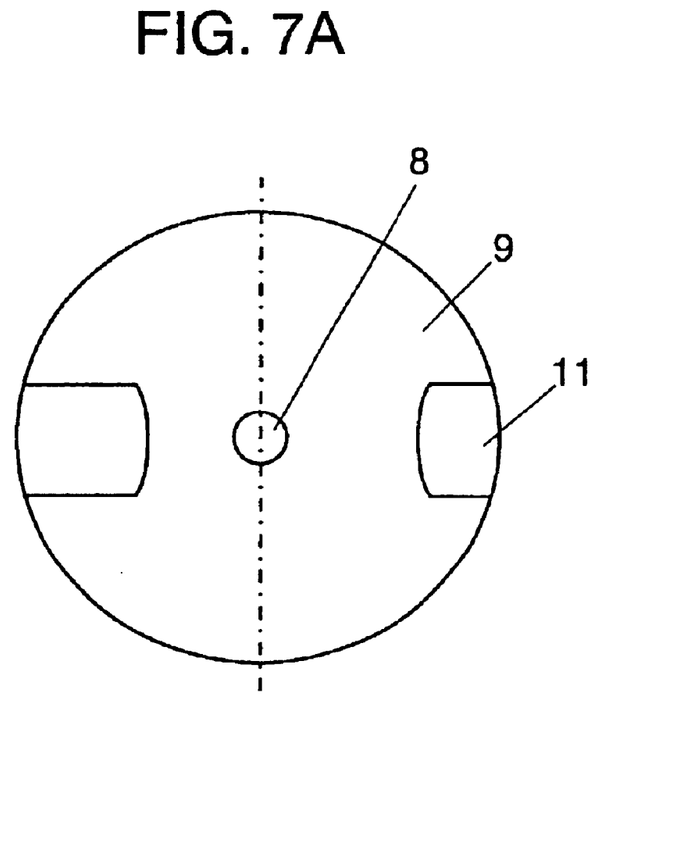
FIG. 7A shows a bottom view of a cylindrical linear actuator.
Figure 7B:
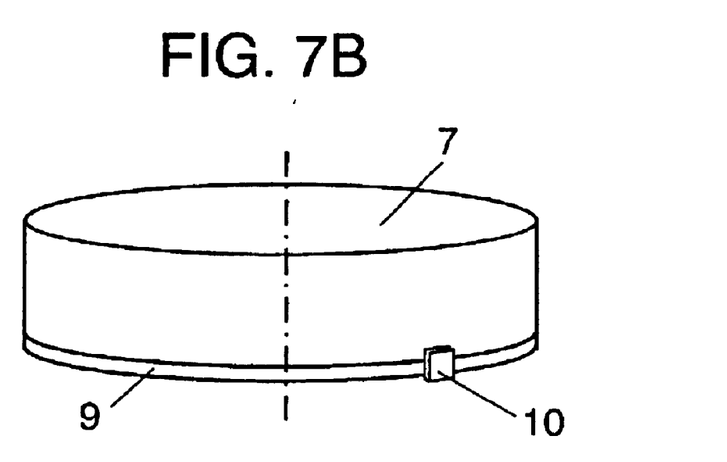
FIG. 7B shows a perspective view of the cylindrical linear actuator shown in FIG. 7A.

FIGS. 4A and 4B show an actuator mounted to circuit board 12 of the cellular phone shown in FIG. 5. Circuit board 12 is a multi-layered and double-sided board, and electronic components other than the actuator are mounted; however, they are omitted in FIGS. 3A and 3B. Land 11 of the actuator is reflow-soldered to a land (not shown) of circuit board 12. A motor driving circuit (not shown) on circuit board 12 powers coils 2 via lands 11, thereby regulating the vibration of the actuator.

As discussed above, the actuator in accordance with this embodiment includes a plurality of lands 11 on the bottom of base 9 as coupling terminals of the actuator. When the actuator is mounted on circuit board 12 and heated, it is soldered to circuit board 12.

This structure fits to the surface mount technology (SMT) method, and the actuator can be reflow-soldered to the circuit board. As shown in FIG. 1, care is taken to land 11 prepared on base 9 not to overflow the bottom area onto the lateral faces, so that the intervals between the adjacent electronic components can be narrowed, which realizes surface mounting of higher density. Land 11 can be protruded vertically from the bottom and engages with holes of board 12, so that the soldering can fix the actuator onto the board more firmly. Other lands which do not work electrically can be provided in addition to lands 11, so that the number of bonding faces between board 12 and the actuator increases. As a result, the actuator is fixed to board 12 much more firmly. Those preparations improve shock resistance of the cellular phone.

A plurality of lands 11 including the additional lands discussed above are placed on both sides of the center line of the bottom. They are preferably placed symmetrically with respect to a point. The center of the bottom often agrees approximately with the gravity center of the actuator, therefore, symmetric placement of terminals, i.e. lands makes combined forces of respective terminals' holding forces coincident with the gravity center position. In other words, impact force can be evenly distributed to the respective terminals, so that the shock resistance property of a device can be exerted to the maximum extent when the cellular phone is dropped. The actuator in accordance with this embodiment is almost covered with the cover, which blocks off the hot blast and infrared ray used for melting solder in the reflow soldering step. The cover thus protects the inside of the actuator from damages due to the heat. The actuator of the embodiment thus fits to the reflow soldering.

The bottom of the actuator is formed of a printed circuit board which is light in weight and excellent both in heat resistance and heat insulation, and the cover helps handling of the actuator. Therefore, the actuator can be mounted onto the circuit board efficiently. The cover also prevents the entry of dust, thus avoids a motor lock due to dust. As a result, the reliability of the actuator can be maintained. As shown in FIG. 4B, actuator 1 vibrates vertically to circuit board 12, so that a user feels greater stroke sensitively.

Outer yoke 4 is shaped in polygon and its inside is punched out cylindrically because thrust force is proportionate to the mass of the mover and because of the mounting points of magnet 5 and coil 2. However, as shown in FIG. 6A through FIG. 7B, the shape of outer yoke 4 can be cylindrical. Inner yoke 3 can be polygonal.

Figure 8A:
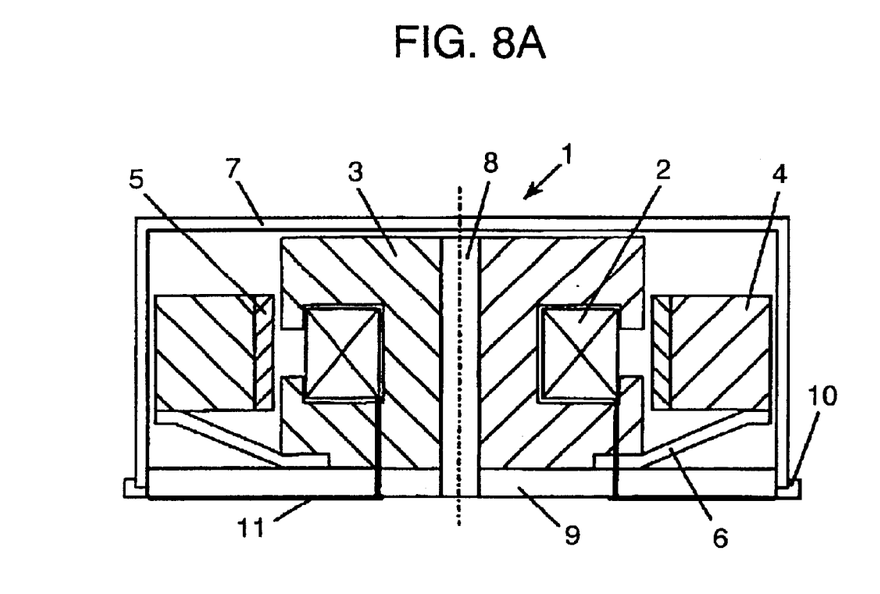
FIG. 8A shows a sectional view of a linear actuator to which a supporter is provided only at a lower section.
Figure 8B:
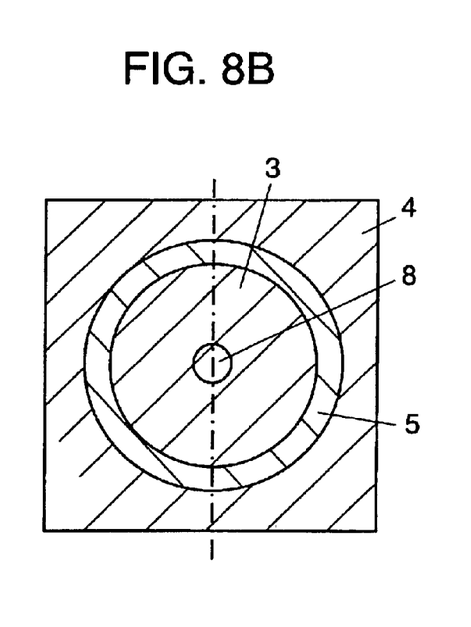
FIG. 8B shows a top view of the actuator shown in FIG. 8A.
Figure 9:
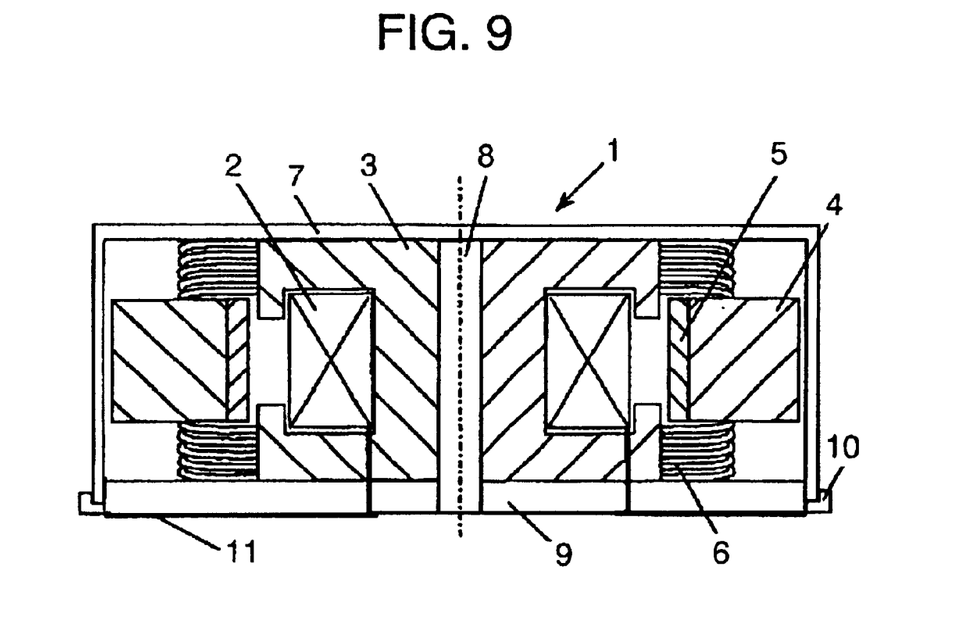
FIG. 9 shows a sectional view of a linear actuator in which a supporter is fixed between a cover and an outer yoke.
Figure 10:
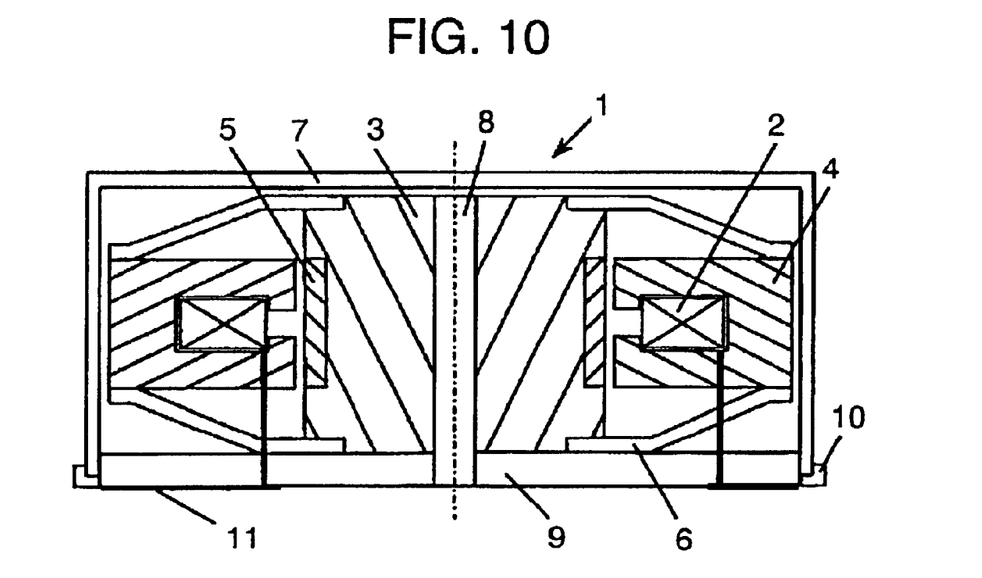
FIG. 10 shows a sectional view of a linear actuator employing moving coils.
Figure 11:
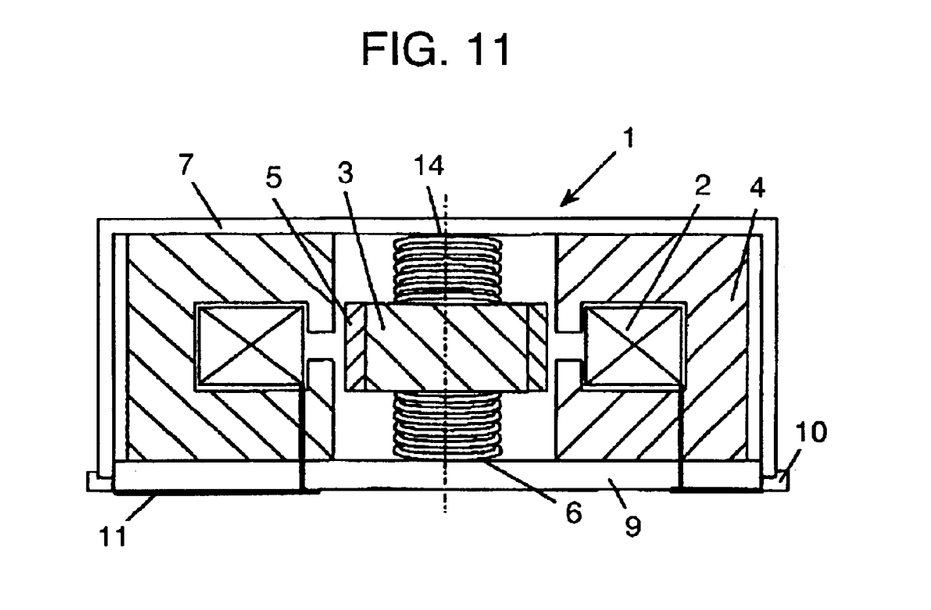
FIG. 11 shows a sectional view of a linear actuator which employs a movable inner yoke.
Figure 12:
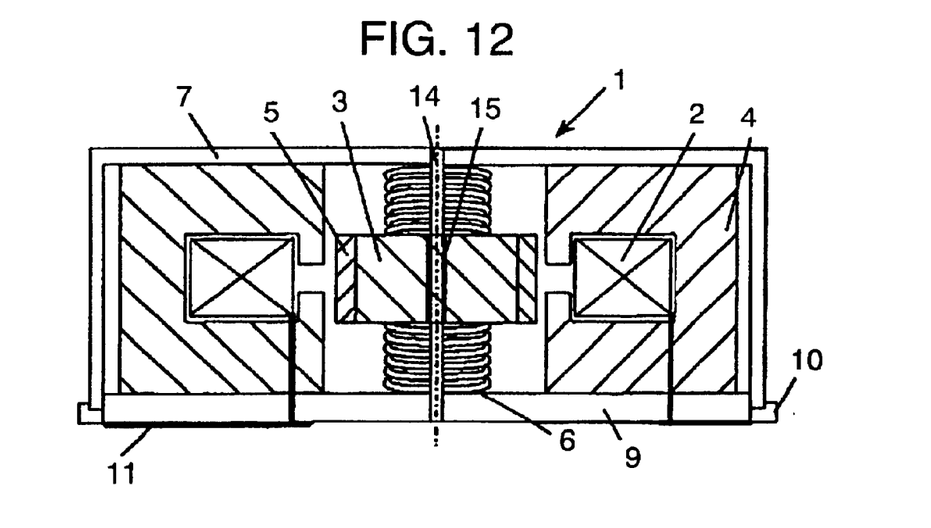
FIG. 12 shows a sectional view of a linear actuator of which mover vibrates along a supporting pin.
Figure 13:
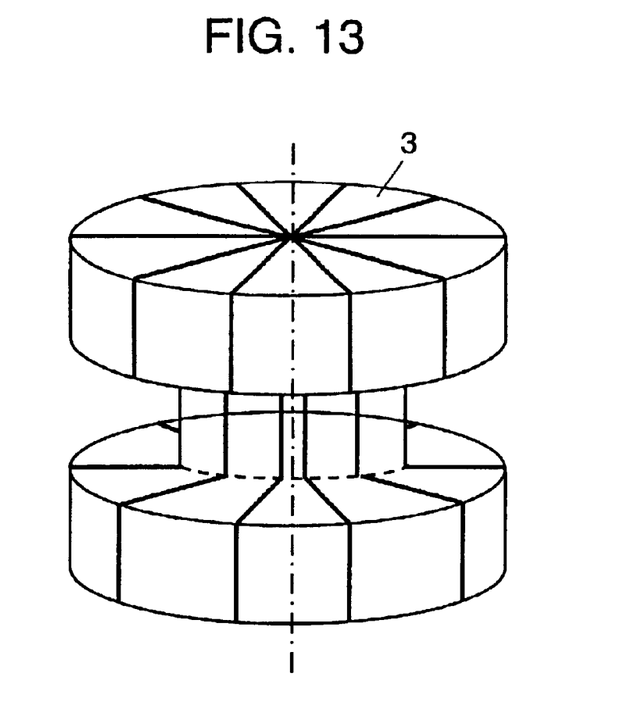
FIG. 13 shows an inner yoke which is irradiated with laser beam.

As shown in FIG. 8A, supporters 6 can be provided to one of upper section or lower section of inner yoke 3 and outer yoke 4. As shown in FIG. 9, supporter 6 is formed of a coil spring and a first end thereof is fixed to case 7 and a second end is fixed to outer yoke 4. As shown in FIG. 10, coil 2 is wound on outer yoke 4, and magnet 5 is mounted to inner yoke 3, and coil 2 works as a mover. In other words, a moving coil structure can be applicable to the present invention. As shown in FIG. 11, outer yoke 4 can work as a stator and inner yoke 3 can work as a mover. As shown in FIG. 12, when a coil spring is used as a supporter, rolling with respect to a vibrating direction sometimes occurs, therefore, pin 14 is prepared for maintaining the clearance between a mover and a stator. Inner yoke 3 can vibrates along pin 14. Pin 14 engages with sliding cylinder 15 inside inner yoke 3. Eddy current runs vertically to a vibrating direction in the actuator, therefore, inner yoke 3 and outer yoke 4 are irradiated with laser beam as shown in FIG. 13, thereby increasing resistance values locally in order to reduce the eddy current.

What is claimed is:

1. A vibrating linear actuator comprising:

a mover including a permanent magnet and being supported to vibrate substantially linearly;

a stator including a coil along side of said mover that produces a magnetic field for vibrating said mover;

said mover moving in a first direction, said stator located along side of said mover in a second direction orthogonal to said first direction;

a base on which said stator is mounted;

a cover, for covering said mover and said stator, provided on said base; and an electrode electrically coupled to the coil and provided on a surface of one of said base and said cover.

2. The vibrating linear actuator of claim 1, wherein said electrode is provided on a bottom of said base.

3. The vibrating linear actuator of claim 1, wherein said mover is supported with an elastic body mounted to said stator.

4. The vibrating linear actuator of claim 1, wherein said mover, said stator and said cover are made from a metallic substance.

5. A portable information terminal including a vibrating linear actuator, the actuator comprising:

a mover including a permanent magnet and being supported to vibrate substantially linearly;

a stator including a coil along side of said mover that produces a magnetic field for vibrating said mover;

said mover moving in a first direction, said stator located along side of said mover in a second direction orthogonal to said first direction;

a base on which said stator is mounted;

a cover, for covering said mover and said stator, provided on said base;

and an electrode electrically coupled to the coil and provided on a surface of one of said base and said cover.

6. The portable information terminal of claim 5, wherein the terminal includes a circuit board, and the vibrating actuator is mounted to the circuit board such that the actuator vibrates vertically relative to the circuit board.

7. The portable information terminal of claim 6, wherein the vibrating linear actuator is mounted to the circuit board by reflow soldering.

* * * * *